United States Patent [19]
Maurino et al.

[11] 3,982,721
[45] Sept. 28, 1976

[54] MOLDING APPARATUS INCLUDING A ONE-PIECE FLEXIBLE MOLD DEFORMABLE BY FLUID PRESSURE DIFFERENTIAL

[75] Inventors: William J. Maurino; Raymond M. Putzer, both of Racine, Wis.

[73] Assignee: Precision Flexmold, Inc., Racine, Wis.

[22] Filed: Jan. 20, 1975

[21] Appl. No.: 542,178

[52] U.S. Cl. .............................. 249/139; 249/127; 264/313; 425/440; 425/DIG. 44
[51] Int. Cl.² .................. B29C 1/16; B29C 1/12; B28B 7/06
[58] Field of Search ........ 249/66, 127, 134, DIG. 1, 249/120, 183, 65, 139; 425/DIG. 44, 440, DIG. 47, DIG. 53, DIG. 122, DIG. 130; 264/313, 316

[56] References Cited
UNITED STATES PATENTS

| | | | |
|---|---|---|---|
| 1,907,502 | 5/1933 | Chilton | 249/120 |
| 1,953,167 | 4/1934 | Geyer | 249/127 X |
| 2,587,852 | 3/1952 | Jahn | 249/127 X |
| 2,660,776 | 12/1953 | Miller | 425/DIG. 44 |
| 2,865,054 | 12/1958 | Constantakis | 425/DIG. 44 |
| 3,162,456 | 12/1964 | Williams | 425/DIG. 47 |
| 3,166,792 | 1/1965 | Goldfarb | 425/DIG. 44 |
| 3,246,369 | 4/1966 | Rhoads | 425/DIG. 47 |
| 3,661,353 | 5/1972 | Newsteder | 249/120 X |
| 3,776,683 | 12/1973 | Putzer | 425/DIG. 44 X |
| 3,815,863 | 6/1974 | Andeweg | 425/DIG. 44 X |
| R19,409 | 1/1935 | Berkeley | 249/127 |

*Primary Examiner*—Francis S. Husar
*Assistant Examiner*—John S. Brown
*Attorney, Agent, or Firm*—James E. Nilles

[57] ABSTRACT

Molding apparatus for molding articles without a seam or parting line even though articles may have severe backdraft portions. The apparatus includes a one-piece flexible mold which is deformable by the application of a fluid pressure differential to thereby release the finished article from the mold. The mold has a self-supporting, radially extending annular flange which forms a seal with a vacuum pot when the mold is set in the pot and the flange has a downwardly extending annular projection or lip which fits freely over the outside diameter of the side wall of the pot. The downwardly extending projection is of sufficient inside diameter to allow the flange to be easily set upon or removed from the vacuum pot and the flange also has sufficiently close tolerances with respect to the outside diameter of the pot as to accurately align and center the mold in the pot. One embodiment of the invention also has a restraining ring member imbedded in the flange, thereby providing means to maintain the shape of the periphery of the flange to prevent it from being completely drawn into the mold when vacuum is applied.

11 Claims, 7 Drawing Figures

U.S. Patent  Sept. 28, 1976  3,982,721
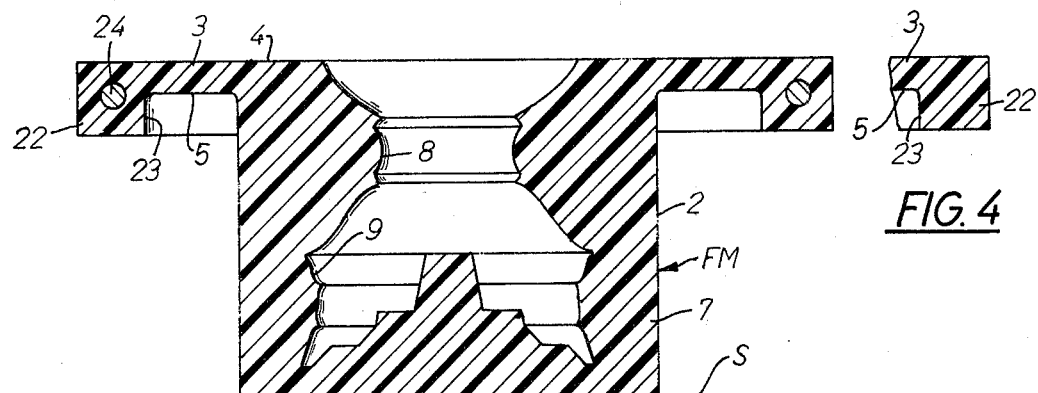
FIG. 1
FIG. 4
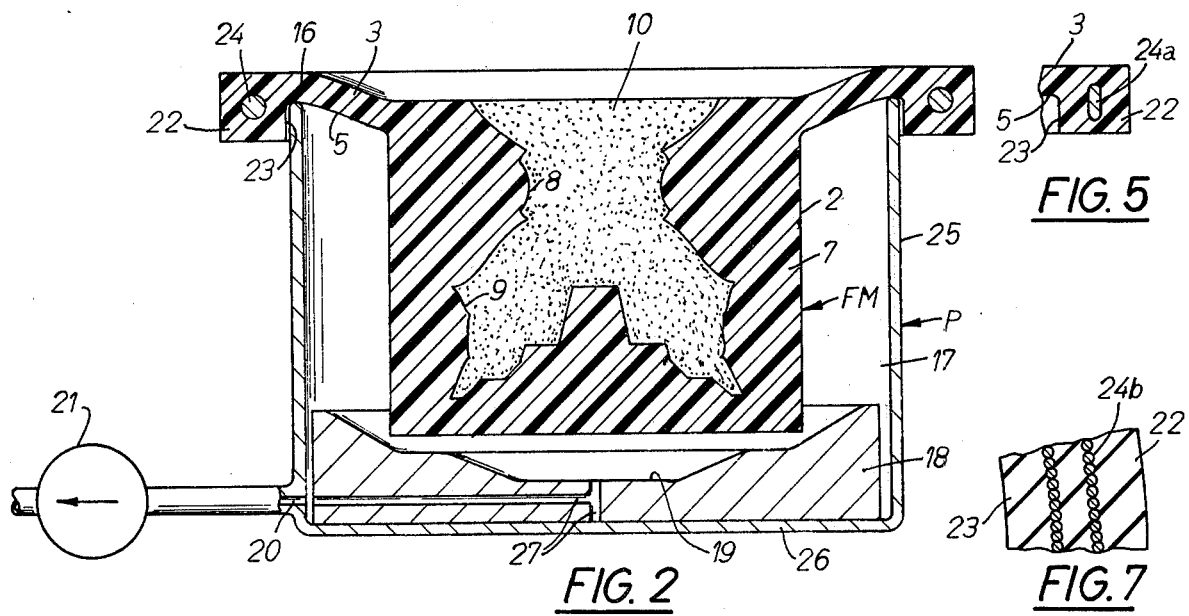
FIG. 2
FIG. 5
FIG. 7
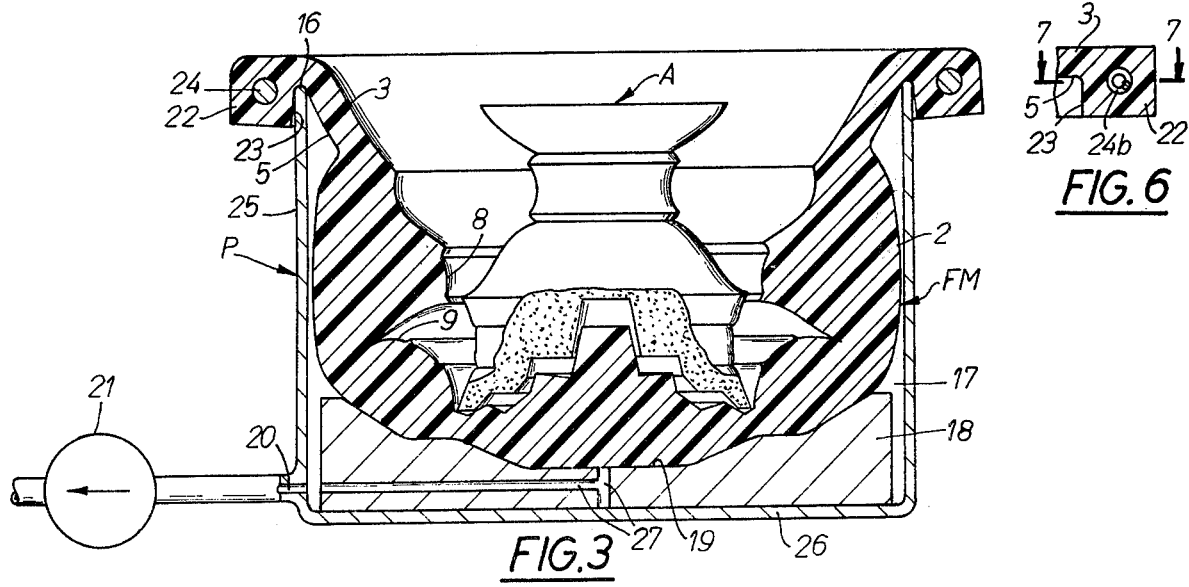
FIG. 3
FIG. 6

MOLDING APPARATUS INCLUDING A ONE-PIECE FLEXIBLE MOLD DEFORMABLE BY FLUID PRESSURE DIFFERENTIAL

BACKGROUND OF THE INVENTION

The invention pertains to improvements in molding devices of the type utilizing a one-piece and generally hollow, distensible and flexible mold which has an interior configuration corresponding to that of the finished product, and utilizing a vacuum to draw the flexible mold away from the molded article to thereby permit the article to be removed notwithstanding undercut portions formed in the article.

Molding devices employing such a flexible mold and vacuum means are shown in the U.S. Pat. No. 3,776,683 issued Dec. 4, 1973 to Putzer et al. The apparatus disclosed therein comprises a generally hollow one-piece, distensible, flexible mold having a side wall of sufficient thickness whereby it is self-supporting and supports the weight of the material poured therein without distortion of the mold. The flexible mold has a thick and self-supporting radially extending annular flange around the upper portion of the mold such that when the mold is placed within a vacuum pot, the flange supports the mold within the pot and forms a seal around the periphery of the upper edge of the pot. The arrangement is such that the pot and the mold form an annular chamber from which vacuum is drawn to thereby distend and expand the mold into the chamber and away from the formed article because the fluid pressure differential created by the vacuum acts on the flexible mold to expand it, consequently causing its separation from the finished article and thereby permitting the article to be removed from the mold, notwithstanding the backdraft portions. At the same time, the flange cooperates with the edge of the pot to maintain the seal as the mold is pulled away from the article formed. As the mold walls are retracted by the vacuum from the article the mold is generally drawn downwardly somewhat into the pot causing the mold flange to stretch and to be pulled down into the pot to some degree.

In the apparatus disclosed in said U.S. Pat. No. 3,776,683 the shape of the flange does not always provide sufficient means to facilitate accurate centering of the mold and the flange is sometimes drawn into the vacuum pot in the event that the mold and flange are inaccurately centered on the upper edge of the pot. The flange shown in U.S. Pat. No. 3,776,683 has a configuration such that the mold may be easily placed in the pot such that the flange does not overlap the wall of the pot evenly at all points around the circumference. If the mold is inaccurately positioned within the pot it has been found that when vacuum is applied to the pot, that portion of the flange having the least overlap over the edge of the pot wall may be completely pulled into the pot thus breaking the vacuum seal between the upper edge of the pot wall and the lower surface of the flange and thereby causing a failure of the operation of the apparatus.

SUMMARY OF THE INVENTION

The present invention is an improvement over the apparatus of U.S. Pat. No. 3,776,683 in that the structure of the flange has been modified by the addition of means to provide quick and accurate centering of the mold within the vacuum pot and by the addition of restraining means to prevent the flange from being drawn into the vacuum pot when vacuum is applied. The flange has been modified by providing a downwardly extending annular projection around the periphery of the flange designed to fit around the outside edge of the top of the vacuum pot, such that the mold may be easily set in the pot with the flange resting on the edge of the pot but having a surface in contact with the outer circumference of the upper edge of the pot such that the mold is accurately positioned within the pot. The downwardly extending projection provides means for accurately positioning the mold when the mold is placed within the vacuum pot and thus prevents any portion of the flange from having an insufficient overlap of the pot wall and thereby retains the entire periphery of the flange in sealed contact with the upper edge of the pot when vacuum is applied to the pot. The improved mold also has a flange including a restraining ring imbedded within its periphery. The ring acts as a means of maintaining the shape and the diameter of the flange such that the periphery cannot be stretched radially inwardly, thus preventing the periphery of the flange from being drawn into the pot.

Another aspect of this invention is that the restraining ring imbedded in the periphery of the pot causes a greater radial expansion of the upper portion of the mold body away from the molded article as the mold is drawn down into the pot by the vacuum, thereby further facilitating removal of articles having substantial undercut portions.

Another aspect of this invention is that the downwardly extending projection around the periphery of the mold facilitates easier handling of the mold.

With the above construction precisely formed articles even having substantial undercut portions are produced in a very rapid manner and with greater consistency than is possible with the prior art.

BRIEF DESCRIPTION OF THE DRAWINGS

FIG. 1 is a vertical cross section view of a flexible mold in accordance with the present invention including a restraining ring imbedded in the downwardly extending annular projection of the flange;

FIG. 2 is a vertical cross section of a filled mold suspended in the vacuum pot and prior to the application of vacuum;

FIG. 3 shows the arrangement of FIG. 2 but with the vacuum applied and with the mold in the fully distended article releasing position;

FIG. 4 is a partial cross section of another embodiment of the downwardly extending annular projection without the restraining ring imbedded therein;

FIG. 5 is a partial cross section of another embodiment of the downwardly extending annular projection including a restraining ring which comprises a steel band;

FIG. 6 is a partial cross section of another embodiment of the downwardly extending annular projection including a restraining ring member which comprises a tightly wound coil spring; and FIG. 7 is an enlarged sectional view taken on line 7—7 of FIG. 6.

DESCRIPTION OF THE PREFERRED EMBODIMENT

Generally, the present invention is concerned with the production of articles formed of hardenable material in flexible molds and particularly those articles having considerable backdraft or undercut portions. Various types of materials may be molded with the present invention and include but are not limited to plaster, cement, resins, paraffin, polyesters, epoxies, metal, urethane foams or other materials.

The flexible material used to comprise the mold body may consist of any flexible mold material having elastomeric properties, the specific type of mold material used generally depending on the compatibility of the mold material with the materials molded. Materials having the desirable elastomeric properties include, for example, but not by way of limitation polyvinyl chloride "Korogel" produced by B. F. Goodrich of Akron, Ohio; polysulphide cold molding compounds sold by Perma Flex of Columbus, Ohio; the silastic RTV silicone rubber produced by Dow Corning and General Electric; and various urethane elastomers.

The invention is shown in FIGS. 1, 2 and 3 as including a generally hollow, one-piece distensible flexible mold FM. This mold has a main generally cylindrical portion 2, adjacent the upper end of which is an integrally formed and relatively thick and self-supporting, radially extending annular flange 3. It will be noted that the upper surface 4 of the mold is generally flat, smooth and unobstructed. Side wall 7 of the mold is of a thickness which varies considerably throughout its height, and defines a cavity 8 in the mold which has, for example, considerable backdraft or undercut portion 9.

The thickness of the wall 7 is such that it is self-supporting and can rest on a flat surface S to support the weight of the fluid material 10 which is poured into the mold to fill the cavity, without distortion of the mold.

The flexible mold FM, as shown in FIG. 2, is inserted in a vacuum pot P which includes an upwardly extending side wall portion 25 and a bottom portion 26, the side wall portion having an upper edge 16 on which the mold and, more particularly, the bottom surface 5 of the flange 3 rests in sealing relationship. Thus the mold and the pot form an annular sealed chamber 17 therebetween. As also shown in FIG. 2, the flange 3 is of such strength and thickness that it freely supports the mold in hanging relationship on the edge of the pot.

In the bottom of the pot is located a material 18 which forms a pit 19 of a particular shape depending on the shape of the article to be formed. The pit 19 allows downward movement of the bottom of the flexible mold away from the molded article A (FIG. 3) when a vacuum is applied. The vacuum is formed by means of passageways 20 leading into the chamber 17 from a conventional vacuum pump 21.

During the operation of this apparatus when the vacuum is applied to the pot the mold is drawn downwardly into the pot and the inner portion of the flange 3 is also stretched downwardly and into the pot as shown in FIG. 3. To maintain the seal between the bottom surface of the flange and the upper edge of the pot, it is necessary that the flange not be fully drawn over the edge of the pot. To insure that the flange sufficiently overlaps the edge of the pot around its complete circumference; the mold and flange must be accurately centered with respect to the pot. To provide means to center the mold, the flange 3 is provided at its periphery with a downwardly extending annular projection 22 which has an inside surface 23 which fits freely over the outside surface of the upper portion of the vacuum pot, as shown in FIG. 2, thereby defining the position of the mold within the pot. The projection at the periphery of the flange has an annular shape and an inside diameter of such dimension as to freely slide over the upper edge of the pot without being stretched outwardly. There may be a small annular gap between the projection and the side wall when the flange is placed over the pot and before the vacuum is applied. This gap is small enough to allow little lateral movement of the mold within the vacuum pot, but is not small enough to require the flange to be stretched or to be forced down around the lip of the pot, thereby causing delay during the process of placing the mold in the pot. As also shown in FIG. 2, the downwardly extending projection may be of a thickness substantially greater than the thickness of the flange, being as much as two or three times the thickness of the flange.

The flange may also include a restraining annular member 24 imbedded in its periphery. The purpose of the member 24 is to maintain the configuration of the periphery of the flange preventing the periphery from becoming distorted or stretched and from being pulled into the pot. The restraining member thus functions to provide additional means of maintaining the vacuum seal between the flange and the upper edge of the pot. The member is preferably made of such a material that when imbedded in the periphery it is not radially compressible and does not become permanently deformed during the handling of the mold. For example, but not by way of limitation, the annular member may be a ring made of plastic or steel having a circular or tubular transverse cross section, or it may comprise a flat steel band 24a (FIG. 5). It may also be desirable to form the member from hollow flexible metal cable or a tightly compressed coil spring 24b as shown in FIGS. 6 and 7 which is not compressible in the radial direction but is flexible in the axial direction with respect to the mold body. Constructing the rigidifying ring from such materials allows the flange to deform during handling while the elasticity of such a ring will cause the flange to reassume its original shape thereby preserving the useful life of the mold. As shown in FIGS. 1, 2 and 3, the ring is imbedded in the periphery of the flange such that it is encased by a thickness of material at least equal to the diameter of the cross section of the ring. If the ring is constructed of steel having a circular transverse cross section, to provide sufficient rigidity, the diameter of the cross section is at least one-half inch.

The inclusion of the retraining ring in the periphery of the flange is particularly useful in those applications where the mold has substantial undercut portions and the neck opening of the mold is substantially narrower in diamter than the undercut portion of the mold cavity because the restraining ring causes the flange to stretch the upper portion of the mold outwardly to a greater extent than the rest of the mold. Without the restraining ring imbedded within the flange, as shown in FIG. 4, in some situations when vacuum is applied, the mold may be pulled to some degree downwardly into the pot and the flange may also be drawn radially inwardly and into the pot. However, when the restraining ring is used, the radial outer portion of the flange is not unduly distorted as the mold is pulled downwardly. Since the flange is attached to the upper portion of the mold the stretching of the flange results in an outward radial force on the upper walls of the mold causing a substantially outward radial stretching of the upper part mold.

RÉSUMÉ

The apparatus provided by this invention thus provides means for securely maintaining the peripheral edge of the flange of a flexible mold in sealing contact with the upper edge of the vacuum pot throughout the molding process while also facilitating rapid placement of the mold within the vacuum pot and avoiding time delay caused by the necessity of clamping the mold to the pot. Furthermore, the apparatus provides means to accurately center the mold within the pot and avoids any operational delay caused during the step of aligning the mold in the pot.

What is claimed is:

1. Apparatus for molding seamless articles comprising, a generally hollow one-piece distensible mold of elastomeric material and having a self-supporting, radially extending annular flange, a vacuum pot having a side wall with an upper edge and being of such size so as to receive said mold therein with said flange resting on said pot edge to form a seal therewith, said mold and pot thus forming an annular chamber therebetween, means for drawing a vacuum on said chamber whereby said mold distends and expands into said chamber to release the molded article from the mold and said flange cooperates with said pot edge to maintain said seal as said mold is retracted from an article therein, said flange having a downwardly extending projection around its periphery freely slidable over said pot wall whereby said flange may be easily set on and removed from the pot and whereby said downwardly extending projection also radially centers said mold in said pot, said flange including a restraining ring member imbedded in its periphery to restrict inwardly radial movement of said periphery, and when vacuum is applied, said projection prevents said flange from being drawn completely into said pot.

2. The apparatus set forth in claim 1 further characterized in that said mold is of such wall thickness that it is self-supporting and supports the weight of the material poured therein without distortion of said mold, and said wall is of such shape that it defines a substantial undercut portion.

3. The apparatus as described in claim 1 further characterized in that said flange and projections are of such strength and thickness that they support the mold in hanging relationship on said pot edge.

4. The apparatus as described in claim 2 further characterized in that said flange and projection are of such strength and thickness that they support the mold in hanging relationship on said pot edge.

5. The apparatus of claim 5 wherein said member comprises a steel ring.

6. The apparatus of claim 5 wherein said member comprises a hollow flexible metal ring whereby said flange may be elastically distorted in a non-radial direction during handling.

7. Apparatus for molding seamless articles comprising, a generally hollow one-piece distensible mold of elastomeric material and having a self-supporting, radially extending annular flange, said mold being of such wall thickness that it is self-supporting and supports the weight of the material poured therein without distortion of said mold, a vacuum pot having a wall with an upper edge and being of such size so as to receive said mold therein with said flange resting on said pot edge to form a seal therewith, said mold and pot thus forming an annular chamber therebetween, means for drawing a vacuum on said chamber whereby said mold distends and expands into said chamber and said flange cooperates with said pot edge to maintain said seal as said mold is retracted from an article therein, said flange having a downwardly extending projection around its periphery freely slidable over said pot wall and said flange further including a restraining ring member imbedded in its periphery to restrict inwardly radial movement of said periphery and to thereby prevent said flange from being drawn completely into said pot when said vacuum is applied to said chamber.

8. The apparatus of claim 7 further characterized in that a restraining ring member is imbedded in said flange.

9. The apparatus of claim 7 wherein said member comprises a steel ring.

10. The apparatus of claim 7 wherein said member comprises a hollow flexible metal ring whereby said flange may be elastically distorted in a non-radial direction during handling.

11. The apparatus of claim 7 wherein said member comprises a coil spring.

* * * * *